United States Patent [19]

Harter

[11] 4,060,070
[45] Nov. 29, 1977

[54] SOLAR HEATING
[75] Inventor: Donald Gerton Harter, Holmdel, N.J.
[73] Assignee: Solar Industries, Inc., Farmingdale, N.J.
[21] Appl. No.: 651,479
[22] Filed: Jan. 22, 1976
[51] Int. Cl.² ............................................. F24J 3/02
[52] U.S. Cl. .................................. 126/271; 165/171; 165/173; 165/180
[58] Field of Search ........................... 126/270, 271; 165/171–175, 180

[56] References Cited

U.S. PATENT DOCUMENTS

| 2,594,232 | 4/1952 | Stockstill | 165/171 |
| 3,239,000 | 3/1966 | Meagher | 126/271 |
| 3,438,432 | 4/1969 | Wetch et al. | 165/180 |
| 3,648,769 | 3/1972 | Scholl | 165/173 |
| 3,918,430 | 11/1975 | Stout et al. | 126/271 |
| 3,982,527 | 9/1976 | Cheng et al. | 126/271 |

Primary Examiner—Kenneth W. Sprague
Assistant Examiner—James C. Yeung
Attorney, Agent, or Firm—Ross, Ross & Flavin

[57] ABSTRACT

A heat collector and radiator for allowing the absorption of lower atmosphere radiation by the maximizing of the surface area capable of absorbing the diffuse radiation. A plurality of closely spaced tubular elements are disposed in parallelism with relatively narrow web portions interconnecting the adjacent tubular elements and in tangential relationship therewith. The structure is unitarily formed from a polymer material admixed with carbon black or like additive. A header means at each opposite end of the tubular elements/web portions communicates therewith. The structure is selective in the respect that it has an emissivity lower than absorptivity, and is less effected by the incident angle.

1 Claim, 7 Drawing Figures

SOLAR HEATING

The invention has reference to new and novel forms of solar fluid heaters which are exceptionally low in cost and highly efficient in operation with a significant capability of maximizing the surface area in absorbing diffuse radiation.

The claimed efficiency is in part the result of a novel configuration which allows the absorption of lower atmosphere radiation, is selective in the respect that it has an emissivity lower than absorptivity, and is less effected by the incident angle.

The solar fluid heater hereof is more efficient in its collection of solar energy, is lower in its cost of manufacture than any known conventional commercially-available unit, is resistant to freezing, and is unaffected by commonly-used heat transfer fluids.

The invention comprehends an extruded blackened plastic material defining a solar collector plate in the form of a multiplicity of closely-spaced tubular elements or accumulators disposed to offer selective radiation properties and provide an increased surface area for the absorption of diffuse radiation.

The low cost feature is made possible by the use of relatively cheap, yet durable, polymer materials fabricated as by extrusion or like low cost techniques. Designwise, the mechanism is unique, its easy assembly, without attendant need for expensive tooling and fixtures, being greatly facilitated.

Known prior art systems using solar energy for heating or cooling air and water spaces, as for instance heating swimming pool water, have been notoriously expensive in their manufacture and use.

Known flat plate type solar fluid heaters normally consist of a flat metal plate with a plurality of widely-spaced, fluid-carrying metal tubes fixedly secured to the plate surface, metal being normally used because of its recognized ability rapidly to conduct the heat absorbed by the plate to the tubes. The tubes are normally formed from copper or zinc-coated steel, best suited to resist the corrosive effects of the fluids passaged therethrough, with the plate being normally formed from copper or aluminum or coated steel, best suited to resist atmospheric corrosion, all materials notoriously expensive in their procurement. Worse, the forming of durable and efficient thermally-conductive joints between plate and tubes is mechanically difficult and economically prohibitive.

When water serves as the heat transfer material, there is the omnipresent danger of tube damage through freezing in the presence of an insufficiency of solar radiation and in the absence of an anti-freeze solution and/or a fool-proof automatically-operating drainage system, either of which precautionary devices represents obvious added expense.

Plastic materials are known to have been used in solar collectors heretofore, at least in the case of swimming pool heating. But where and when plastic materials have been used, their relatively poor thermal conductivity has presented serious problems and to offset these difficulties, collector plates are known to have been designed in manner so that the supporting fluid nearly fills those portions of the plate which are exposed to solar radiation. Due to radiation losses, such collectors are relatively inefficient at the collector temperatures essential to proper space heating.

I envision the use of an extruded polymer having a carbon black or like additive incorporated therewith to produce a dull black collector plate of the present invention.

The absorptivity of a flat black enamel or lacquer on a metallic surface is known to be in the 0.94 to 0.98 range, whereas I have determined that the absorptivity of an extruded black polymer approximates 0.92 to 0.96.

In the encounered temperature range as contemplated in comnection with my collector plate, its emissivity ($\epsilon$) is considered to be equal to its absorptivity.

The reabsorbed energy here exploited is not reflected from a reflective surface, as in the case of a focusing collector for example. Rather it is energy which has been absorbed by the surface acting as a black body and subsequently emitted. This emitted energy is again absorbed and again emitted by the surface it strikes with a portion thereby being again conducted to the heat transfer fluid therewithin.

In some collector plates heretofore known, glass cover plates have been used first, to reduce conduction and convection losses in cases of a substantial collector to ambient temperature difference, and/or second, to block radiation losses from the collector plate.

The sun's radiant energy reaching earth is in a spectrum with wave lengths from 0.29 to 3.0 microns, with radiation emitted by a collector plate having wave lengths of 3.0 microns or larger, peaking between 8 and 10 microns.

Prior art devices using glass for the cover plate offer a transmissivity of 0.85 to 0.90 at normal incidence (understandably decreasing with any increase in incident angle) for short wave radiation from the sun. Nonetheless, this same glass is nearly opaque to the long wave radiation emitted by the collector plate.

The use of short polymers for cover plates has consistently been considered as being of limited acceptability because while they have substantially greater transmissivity than glass (i.e. even as high as 0.96 to 0.98 for the radiation from the sun), they also have transmissivity of 0.30 or greater for the long wave radiation from the collector plate.

The primary significant feature of novelty herein lies in the selective properties of my mechanism. By extruding polypropylene with a carbon black or like additive in the configuration described, a collector with an absorptivity of 0.92 and an emissivity of approximately 0.58 results, thereby allowing the use of sheet polymer cover plates not characterized by unacceptable losses from emitted radiation. Therewith I achieve a greater absorption through a low transmittance loss, a lower weight, a lower cost, and of course less breakage, all in the face of an advantageous increase in absorption efficiency throught the absorption of the long wave length radiant energy from the lower atmosphere.

The Stefan-Boltzmann law of thermal radiation may be used for calculating the radiant energy emitted by a black body by the formula:

$$0.1714 \times 10^{-8} (T^4) \, \epsilon \, BTU/ft^2$$

where T is the absolute temperature (°R) of the collector surface and $\epsilon$ is its emissivity. $\epsilon$ equals absorptivity and is approximately 0.92 for extruded polypropylene with carbon black or like additive.

Figure 1:
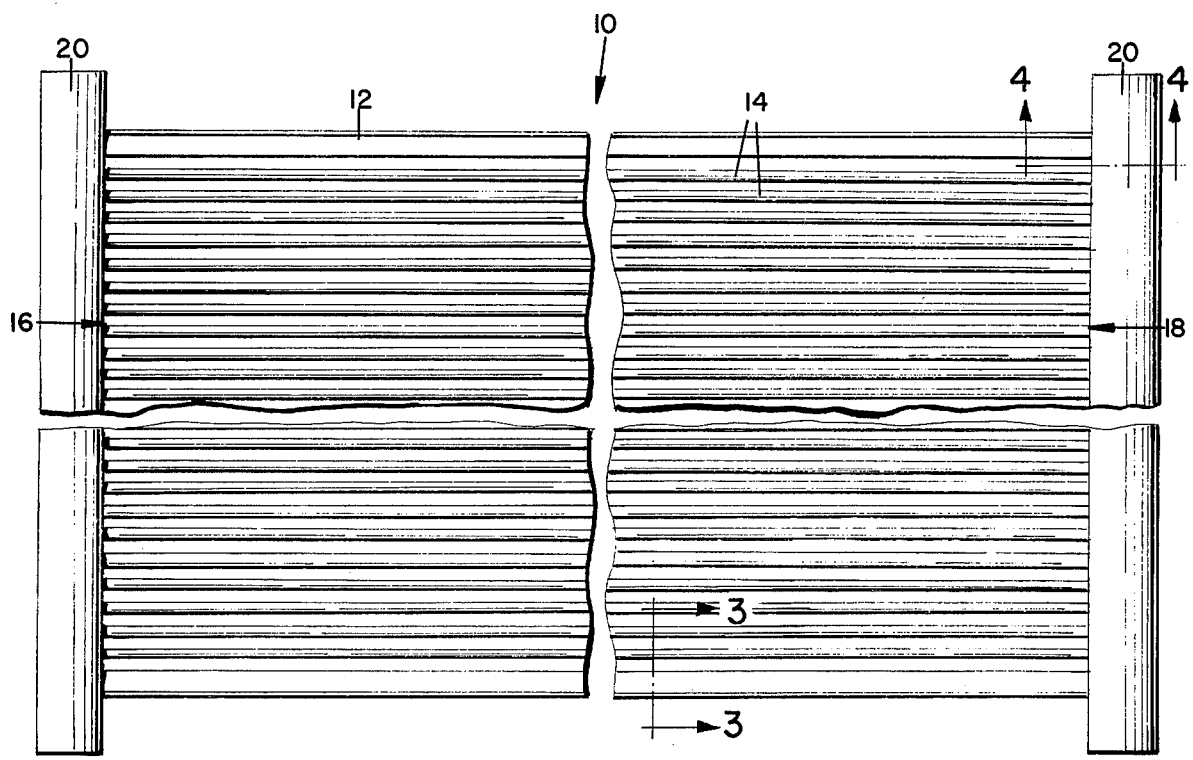
FIG. 1 is a broken view, in top plan, of the collector.
Figure 2:
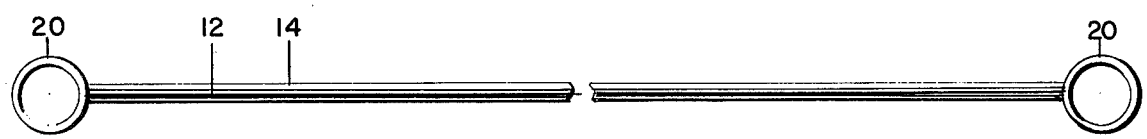
FIG. 2 is a broken view, in side elevation, of the FIG. 1 collector.
Figure 3:
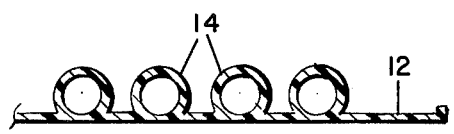
FIG. 3 is a large scale section on the line 3—3 of FIG. 1.
Figure 4:
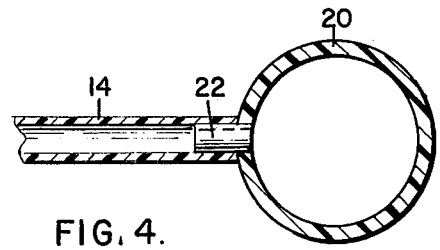
FIG. 4 is a large scale section on the line 4—4 of FIG. 1.

A solar water heater for use in heating such as a swimming pool is exemplified in FIGS. 1 - 5.

A collector plate, the main body of which is designated generally by 10, is an extrusion of polypropylene, polyethelene or other suitable plastic defining a base plate or web 12 and a plurality of spaced parallel hollow tubes or accumulator 14 extending from one end 16 to the opposite end 18 of the base plate, the tubes being tangentially related to the base plate. If desired, the extrusion could be in sections of small width, say in the order of 6 inches, the sections being joined together as by snap joint or sonic bonding.

The extrusion technique offers me the advantage of low cost fabrication and yet allows me all of the dimensional and physical features which my mechanism dictates.

To maximize solar energy absorption, the material is colored a dull black by way of adding carbon black or like substance to the plastic mix prior to its extrusion or by coating the exterior surfaces of the extruded components.

In an exemplary prototype of my design for experimental purposes, the collector plate included, in a 4 feet width of base plate, a system of 91 tubular elements, each 0.294 inch and 0.254 inch in outside and inside diameters respectively and each tangential to the base plate.

The diameters of and the spacing between adjacent tubular elements 14 may be varied so as best to adapt the properties to a particular application or, conceivably, climate.

Nonetheless, the concept of a relatively large number of closely spaced tubular elements 14 of generally tubular configuration interconnected by a plate or web to which they are tangential 12 is of primary importance and significance.

The key to optimal performance lies in the arrangement of a multiplicity of closely spaced parallel tubular elements with relatively narrow web portions interdigitated between adjacent tubular elements.

Plate or web 12 is secured at each of its ends to an extruded plastic header tube 20 having small tubular adapters 22 to adapt a communicating connection between the interior of each tubular element 14 and each adjoining header tube, such adapters 22 being extruded from the same material as the main body and header tubes. Preferentially, a magnetic material, conceivably powdered iron, is added to the plastic mix prior to the forming of the adapters.

At the assembly point, a high frequency induction coil is preferably used to generate a high temperature at all contact areas, thereby to secure leakproof joints between all tubes and headers.

Figure 5:
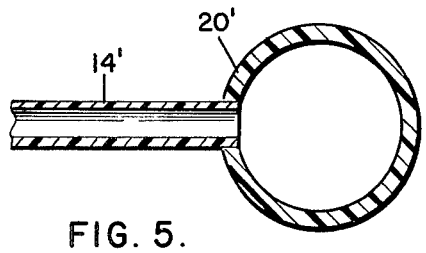
FIG. 5 is a view, similar to FIG. 4, showing a modified form of jointure between the main body of the connector and the header-to-be.

Alternatively, the components could be heated by any conventional means so as to achieve the desired thermal bond without the use of adapters as shown in the FIG. 5 modification showing a tube 14' and an end header 20'.

Figure 6:
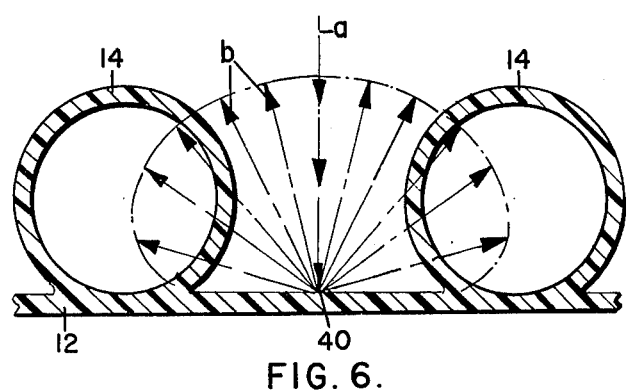
FIG. 6 is a fragmentary large scale section of a main body of the connector showing schematically the relationship between solar radiation and the emitted ray pattern.

The capacity of the collector plate to reabsorb emitted radiation contributes to its performance as dramatised by the FIG. 6 schematic.

The direct radiation from the sun along the axis designated by line a strikes a web surface at point 40. Granted that the maximum absorbed energy occurs when the sun's rays are at normal incidence to the surface and that at all other times the absorption is proportional to the cosine of the angle of incidence as the earth rotates, the figure illustrates that only the projected area of the adjacent tubular sections and only a small area of the web are exposed to direct radiation where, at normal incidence, total absorption by the portions of the tubular sections is minimal. However, as the earth position changes, the projected area and incident angles remain constant while an adjacent tube casts a growing shadow. Within the dimensions shown, the average capacity for absorbing direct radiation for the entire day is approximately equal to that of a conventional collector plate. This makes possible its use on a greater number of existing structures and in many cases reduces the cost of new construction.

There are two major reasons for the superiority of the structures of this invention. The total surface area of the tubular sections is twice that of flat panels with the same overall size due to the tangential arrangement of the tubes. This means that the panels of the invention will absorb up to twice as much direct or diffuse radiation as flat panels. When the sun's energy is in the form of direct radiation, radiation falling on the web portion between the closely spaced tubes is reradiated into the tubes so as in effect to trap some of the energy that a conventional flat panel loses through reradiation to the sky. The other advantage is that as the earth's rotation appears to cause the sun to move from east to west during the day, the sun's rays are at right angles to the surface of a conventional flat plate only at one instant during the day. At all other times, they are at a lesser angle to the surface meaning less energy absorbed. But with the arrangement of the invention, this angle change does not reduce solar heating through much of the day, wherefore the energy absorbed is more nearly constant throughout the day and the construction is less sensitive to variations in positioning and orientation. In fact, with the invention it is possible to obtain the desired temperature level with less panel area.

Besides direct radiation, there are two additional sources of radiant energy from the sun, both of which are non-directional and are absorbed by the total surface area: diffuse radiation; second, lower atmospheric emission.

Diffuse radiation is direct radiation which has been scattered by water droplets or particulate matter in the atmosphere. It ranges from a normal minimum of 8 percent to 100 percent of the available radiation. Since the total area of the plate shown is 2.04 times that of a flat plate, 8 percent diffuse radiation will give 8.3 percent higher efficiency.

Atmospheric radiation is in the form of long wave radiation and will pass through a polymer cover plate, same being limited by transmissivity, and will for the most part offset the net emission losses.

The element of selectivity enters into the picture by virtue of the fact that, when a black body is heated, each surface increment emits energy in a somewhat hemispherical pattern and some of the radiation emitted by the flat or web areas and by the tubular areas will be absorbed by adjacent areas, thereby having the desirable effect of reducing the total emision to atmosphere.

In this disclosure, the widths of plate area between adjacent tubes are noted to be extremely short, and a relatively greater exposed area will be seen to be wetted by the heat transfer fluid, all having the desirable effect of negating the significance of the relatively poor conductivity of the polymer material employed.

The radiation emitted from the collector surface is diffuse, which is to say that it is emitted in a nearly hemispherical pattern as dramatised by the plurality of lines $b$ in FIG. 6.

The emitted radiation pattern indicates the approximate relative intensity of the radiation emitted from one point 40 on the collector surface, from which point a significant part of the emitted radiation will strike adjacent parts of the collector surface. These parts will emit, following the same pattern, with a portion of that radiation falling on an adjacent collector section.

Since $\epsilon$ is less than unity, it follows that each time the emitted radiation is absorbed and reemitted a portion will remain until in the end a significant portion of the total solar energy that would be lost to a conventional collector plate is absorbed.

Herewith, the effective emissivity ($\epsilon$) of the surface can be shown to be in the area of 0.58.

Another salient advantage hereof relates to the large absorption area exposed to diffuse solar radiation.

For example, the dimensions used in the example above provide a total area for absorption of diffuse radiation 2.04 times that of a conventional flat plate collector.

It has been established by various studies that the daily diffuse radiation within the continental United States ranges between 8 and 100% of the total.

Up to 80% of the clear day solar radiation may be available as diffuse radiation on a day with high thin cloud cover. Of course, the amount of diffuse radiation varies from day to day.

It is thus obvious that my improved capacity for absorption of diffuse radiation will result in the absorption of a greater total amount of solar energy over a several months period.

I have determined that, on a given summer day, by locating my invention at approximately 40° north latitude, facing south, with the collector plate surface disposed at an angle of 30° relative to the earth surface, the collector will collect 13.5% more solar energy on each square foot of projected surface than a conventional flat plate solar collector plate used for heating swimming pools.

Figure 7:
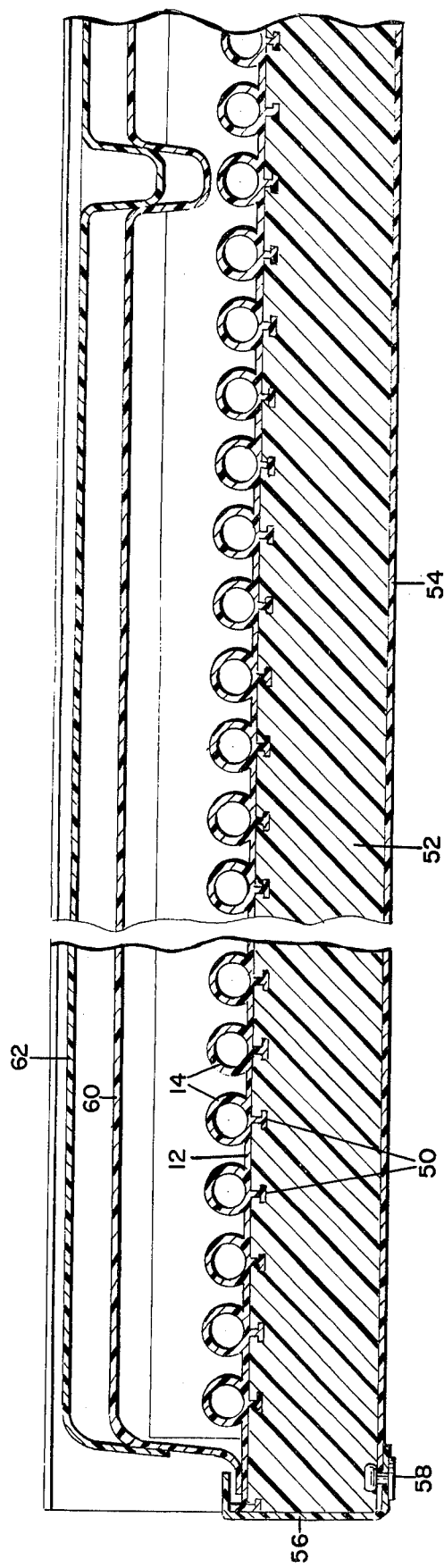
FIG. 7 is a broken view, in section, through a modified form of collector plate and related components.

The collector plate for heating and cooling air spaces is shown in FIG. 7 as a complete general purpose collector assembly.

If desired, the collector plate formation may be otherwise extended to provide ribs 50 of T-form on the side of the base opposite from the tubes 14, same being used for securing the plate to a foamed plastic insulation backing 52 which may be of a rigid polyurethane type foamed in situ and supported by a housing 54 with opposite side channels 56 being secured thereto as by blind rivets 58, the insulation backing helping to reduce convection and conduction losses to any supporting structure.

The insulation backing may be of polyurethane or other suitable type, mixed in liquid form and poured into the defined cavity between collector plate and metal housing preliminary to expansion into a foam to adhere to the housing and mechanically lock with the collector plate as a rigid structure. As the thermal conductivity of this material is less than one half that of the mineral wool or fiberglass insulation used in conventional solar energy collectors, it can be thinner, thereby further reducing the cost and weight of the unit.

In this exemplification, the particular shape of the ribs and their dimensions is relatively unimportant; the essential feature is that they desirably create a mechanical locking action into the insulation.

During colder months, it may be desirable to use a transparent cover plate 60 over the collector plate to help to reduce radiation and convection losses to the atmosphere. The cover plate may be of sheet polyvinylfloride although other suitable plastic may be employed so long as it offers high transmissivity and long life under exposure to the elements.

In some instances, a second cover plate 62 of like configuration may be used in connection with encountered high fluid temperatures in cold climates, same being so designed as to draft angles that an upper cover plate may be conveniently nested relative to and spaced upwardly from a lower cover plate, as shown.

The ends of the casing 56 are flanged inward at a height to retain the second cover plate. The outlet end is fastened permanently in place after the polyurethane foam insulation has expanded. The assembly is held in a fixture for foaming and the polyurethane components are poured into the open end. The inlet-end is removable so the cover plate or plates may be replaced or removed during the summer months for maximum efficiency heating and/or dissipation (during night-time hours) of heat rejected into a pool or storage tank by a suitable water-source heat pump means.

This invention envisions the use of one or more cover plates made from sheet polyfluoride, polycarbonate, acrylic or other transparent plastic material that will not deteriorate from the effects of solar radiation and weathering.

These materials are light in weight, resist breakage, and have greater transmissivity for solar radiation. Transmissivity for radiation 0.3 microns wavelength and less is typically 0.96 to 0.98 and is not significantly reduced with an increase in incident angle. The use of plastic cover plates in conventional collectors has been limited by the fact that they have a transmissivity of up to 0.40 for the long wave radiation emitted by the collector plate.

The reduced emissivity of the collector plate hereof reduces the radiation losses from the plate, making the use of plastic cover plate feasible.

The construction exemplified permits removal of the cover plates during the summer months to improve efficiency when used as a swimming pool heater, or to permit dissipation of heat from a water source heat pump used for cooling, by running water from the storage tank through the collectors during night-time hours.

It has been found that the collector plate hereof, located at approximately 40° north latitude, facing south at an angle of 50° from the earth's surface collects a total of 9 percent more solar energy than a conventional solar collector using an aluminum collector plate with copper tubes and two glass cover plates.

I claim:

1. A mechanism for the collection of heat from solar radiation by the maximizing of the surface area capable of absorbing direct radiation and diffuse radiation and trapping some radiation for purposes of reradiation comprising:

a unitary construction of a polymer mixed with a black coloring agent consisting of planar web of a certain thickness and certain width and certain length and a multiplicity of closed-spaced parallel-disposed tubular elements extending across the entirety of the certain web width and throughout the entirety of the certain web length, each tubular element being of circular cross section and having a wall thickness equal to the certain web thickness, the web and each tubular element merging into each other along each respective line of contact with each tubular element projecting upwardly from the web plane, a pair of apertured header tubes of circular cross section extended transversely to and bonded at opposite ends of each of the tubular elements and a tubular communicating adapter extended through each aperture in each header tube and into the interior of a respective tubular element for effecting a communicating connection therebetween.

* * * * *